(12) United States Patent
Reeves et al.

(10) Patent No.: US 7,907,892 B2
(45) Date of Patent: Mar. 15, 2011

(54) TRANSPARENT COMMODITY TRADING NETWORKS AND METHODS OF FACILITATING TRANSACTIONS AMONG BUYERS AND SELLERS OF PRODUCTS AND SERVICES

(75) Inventors: Jonathan Reeves, Roswell, GA (US); Karl Cartwright, Lawrenceville, GA (US)

(73) Assignee: AT&T Intellectual Property I, LP, Reno, NV (US)

( * ) Notice: Subject to any disclaimer, the term of this patent is extended or adjusted under 35 U.S.C. 154(b) by 701 days.

(21) Appl. No.: 11/650,012

(22) Filed: Jan. 5, 2007

(65) Prior Publication Data

US 2008/0167967 A1 Jul. 10, 2008

(51) Int. Cl.
| | |
|---|---|
| *H04B 7/15* | (2006.01) |
| *H04B 7/185* | (2006.01) |
| *H04B 7/00* | (2006.01) |
| *H04M 3/42* | (2006.01) |
| *H04M 1/00* | (2006.01) |
| *H04M 11/00* | (2006.01) |
| *H04M 1/66* | (2006.01) |
| *H04M 1/68* | (2006.01) |
| *H04M 3/16* | (2006.01) |
| *H04H 60/09* | (2008.01) |
| *G06Q 40/00* | (2006.01) |
| *G06Q 30/00* | (2006.01) |
| *G06Q 20/00* | (2006.01) |
| *G06F 17/30* | (2006.01) |
| *G06F 21/00* | (2006.01) |
| *H04W 4/00* | (2009.01) |
| *H04W 24/00* | (2009.01) |

(52) U.S. Cl. ................ 455/11.1; 455/414.1; 455/3.04; 455/466; 455/550.1; 455/411; 455/405; 455/456.3; 455/456.1; 705/39; 705/51; 705/80

(58) Field of Classification Search .............. 455/11.1, 455/13.1, 41.2, 406, 414.1, 3.04, 466, 550.1, 455/411, 4.5, 456.1, 456.3; 705/26–27, 39, 705/51, 803
See application file for complete search history.

(56) References Cited

U.S. PATENT DOCUMENTS

| | | | | |
|---|---|---|---|---|
| 6,317,784 | B1* | 11/2001 | Mackintosh et al. | 709/219 |
| 6,728,776 | B1* | 4/2004 | Colbath | 709/231 |
| 7,318,196 | B2* | 1/2008 | Crow et al. | 715/716 |
| 7,444,353 | B1* | 10/2008 | Chen et al. | 707/104.1 |
| 7,496,327 | B2* | 2/2009 | Nagamoto et al. | 455/3.01 |
| 2003/0054795 | A1* | 3/2003 | Tamaki et al. | 455/406 |
| 2004/0127199 | A1* | 7/2004 | Kagan et al. | 455/414.1 |
| 2005/0250439 | A1* | 11/2005 | Leslie | 455/11.1 |
| 2006/0183423 | A1* | 8/2006 | Johansson et al. | 455/41.2 |
| 2006/0240852 | A1* | 10/2006 | Al-Sarawi | 455/466 |
| 2007/0123215 | A1* | 5/2007 | Wang et al. | 455/411 |
| 2008/0097927 | A1* | 4/2008 | Renzi | 705/80 |
| 2008/0167993 | A1* | 7/2008 | Cue et al. | 705/51 |
| 2008/0214210 | A1* | 9/2008 | Rasanen et al. | 455/456.3 |

* cited by examiner

*Primary Examiner* — Matthew D Anderson
*Assistant Examiner* — Bobbak Safaipour
(74) *Attorney, Agent, or Firm* — Myers Bigel Sibley & Sajovec, P.A.

(57) ABSTRACT

A transparent commodity trading network facilitates transactions among parties. A plurality of mobile communications devices are each configured to broadcast product/service needs and/or product/service offerings of a party associated with the respective mobile communications device. Each mobile communications device is configured to receive product/service needs and/or product/service offerings broadcast by other mobile communications devices when respective mobile communications devices pass within a predetermined distance of each other. Each mobile communications device is configured to identify when a product/service need or product/service offering broadcast by another mobile communications device matches a corresponding product/service offering or broadcast product/service need broadcast by the respective mobile communications device. A transaction service that is accessible by each mobile communications device is configured to allow two parties that have a matching broadcast product/service need and offering to identify and communicate with each other.

17 Claims, 5 Drawing Sheets

TRANSPARENT COMMODITY TRADING NETWORKS AND METHODS OF FACILITATING TRANSACTIONS AMONG BUYERS AND SELLERS OF PRODUCTS AND SERVICES

FIELD OF THE INVENTION

The present invention relates generally to commerce and, more particularly, to the promotion of commerce.

BACKGROUND OF THE INVENTION

The Internet has evolved into a viable commercial medium where buyers and sellers of goods and services can engage in various types of commerce. Various on-line "want-ad" services exist, such as Craig's List, where buyers list what they are looking for and sellers list what they wish to sell. Unfortunately, many potential buyers and sellers don't participate in the various on-line want ad services. In addition, there has been a great proliferation of commerce-oriented web sites that offer various products and services. Unfortunately, even with current search engines, it can be difficult for potential customers to find out about such web sites and the products and/or services they offer. As such, there is a need for more efficient and effective ways of passing information among potential buyers and sellers of products and/or services and for reaching more potential buyers and sellers.

SUMMARY OF THE INVENTION

According to some embodiments of the present invention, transparent commodity trading networks are provided that facilitate transactions among potential buyers and sellers of products/services. A plurality of mobile communications devices are each configured to broadcast product/service needs and/or product/service offerings of a party associated with the respective mobile communications device (i.e., the party in possession of the mobile communications device). In addition, each mobile communications device is configured to receive product/service needs and/or product/service offerings broadcast by other mobile communications devices when respective mobile communications devices pass within a predetermined distance of each other. In addition, each mobile communications device is configured to identify when a product/service need or product/service offering broadcast by another mobile communications device matches a corresponding product/service offering or broadcast product/service need broadcast by the respective mobile communications device. A transaction service that is accessible by each mobile communications device is configured to allow two parties that have a matching broadcast product/service need and offering to identify and communicate with each other.

According to some embodiments of the present invention, a mobile communications device can serve as an intermediary ("mule") that carries a broadcasted need and/or offering of another party associated with another mobile communications device. For example, as a mobile communications device passes by other devices, it receives and stores broadcasts received from these other devices. The mobile communications device is configured to identify when there is a match among product/service needs and offerings of other parties. When a match is identified, the matching parties are notified and then identify and communicate with each other via a transaction service.

According to some embodiments of the present invention, the system may include one or more stationary communications devices that are configured to broadcast product/service needs of respective parties associated with the stationary communications devices. Mobile communications devices are configured to receive the product/service needs and/or offers broadcast by stationary communications devices when passing within a predetermined distance thereof, and are configured to identify when broadcast product/service needs and/or offers match product/service offerings and/or needs of parties associated with the mobile communications devices.

According to some embodiments of the present invention, a transaction service of a transparent commodity trading network is configured to collect and analyze information associated with transactions between parties.

According to some embodiments of the present invention, a transaction service of a transparent commodity trading network is configured to provide ratings of products/services associated with transactions between parties.

According to some embodiments of the present invention, a transaction service of a transparent commodity trading network is configured to allocate a percentage of a transaction value to a party associated with a mobile communications device that serves as a mule. In addition, a transaction service may be configured to accrue currency for a party associated with a mobile communications device that serves as a mule.

BRIEF DESCRIPTION OF THE DRAWINGS

The accompanying drawings, which form a part of the specification, illustrate key embodiments of the present invention. The drawings and description together serve to fully explain the invention.

DETAILED DESCRIPTION OF EMBODIMENTS OF THE INVENTION

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Java, AJAX, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. Embodiments of the present invention are not limited to a particular programming language. It will be further appreciated that the functionality of any or all of the program modules may also be implemented using discrete hardware components, one or more application specific integrated circuits (ASICs), or a programmed digital signal processor or microcontroller.

The present invention is described herein with reference to flowchart and/or block diagram illustrations of methods, systems, and computer program products in accordance with exemplary embodiments of the invention. These flowchart and/or block diagrams further illustrate exemplary operations for facilitating transactions among parties, in accordance with some embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 1:
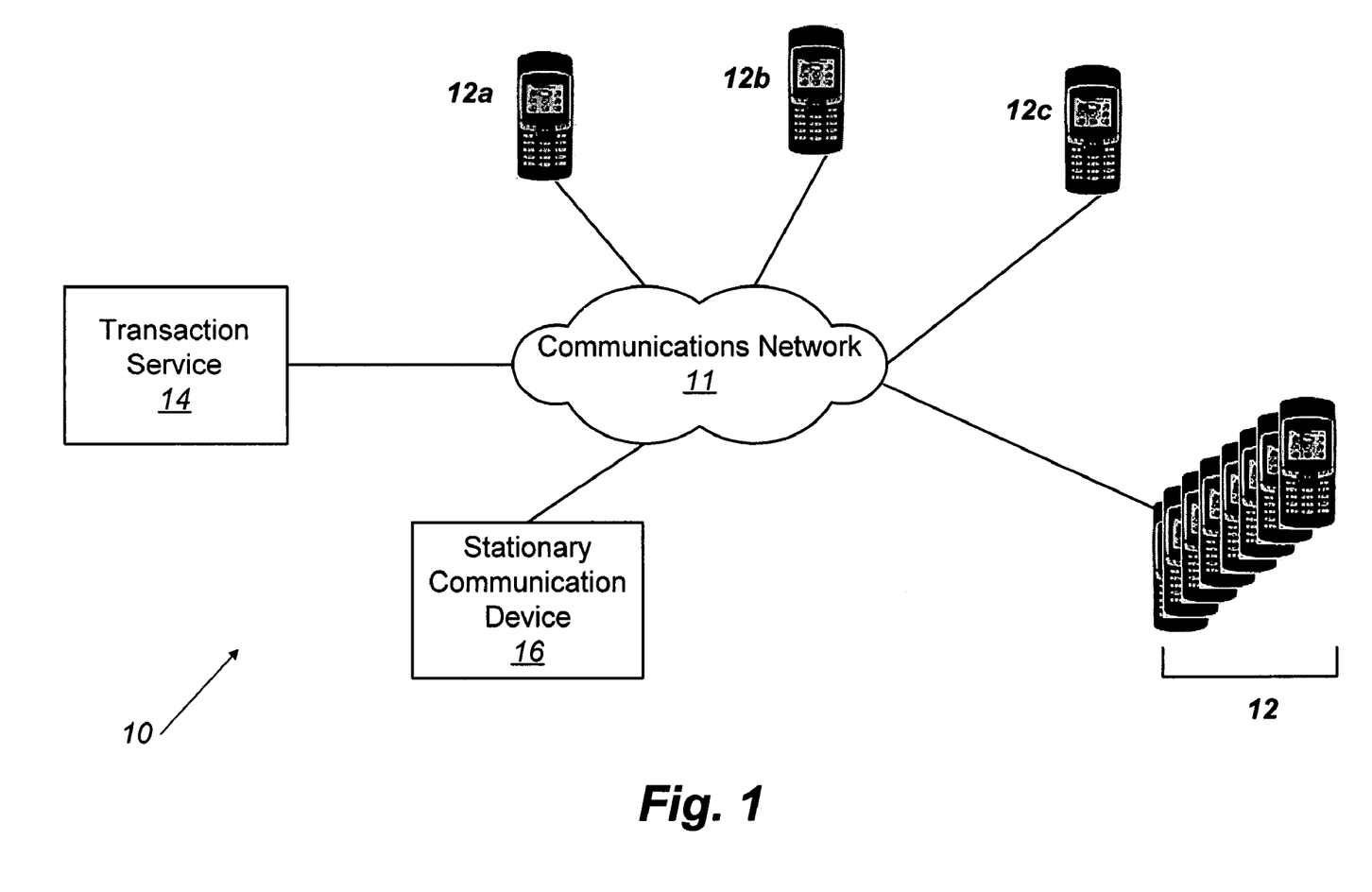
FIG. 1 illustrates a system that facilitates transactions among parties, according to some embodiments of the present invention.

FIG. 1 illustrates a system 10 that facilitates transactions among parties carrying mobile communications devices, according to some embodiments of the present invention. The system 10 includes a plurality of mobile communications devices 12 that are each capable of broadcasting and receiving messages over a localized or wide geographic area. These mobile communications devices 12 may be connected to a communications network 11 (e.g., the Internet, an intranet, telecommunications network, etc.). Mobile communications devices 12 can be configured to broadcast within a range of distances. For example, a mobile communications device 12 may be configured to broadcast product/service needs and product/service offerings up to a radius of about thirty (30) feet from the mobile communications device 12. Thus, two mobile communications devices 12 that pass within a predetermined radius of each other each receive messages broadcast by the other, as described herein.

Mobile communications devices 12, according to some embodiments of the present invention, may broadcast and receive messages on a continuous or intermittent basis. Mobile communications devices 12, according to some embodiments of the present invention, may broadcast and receive messages only upon sensing that another mobile communications device is within a predetermined range. For example, a mobile communications device may be configured to broadcast a message when it senses the presence of another mobile communications device that is configured to receive the message. A party associated with a mobile communications device may also be able to selectively activate and/or deactivate message broadcasting and receiving of a mobile communications device 12.

Each mobile communications device 12 may be, for example, a cellular telephone, a PDA, an internet protocol or other packet switched wireless communications device, a Bluetooth or WiMax enabled device, an RFID device, a combination thereof, or any of a wide variety of other communications systems. Mobile communications devices, according to some embodiments of the present invention, may be mounted in mobile objects, such as automobiles, trucks, aircraft, trains, buses, bicycles, boats, etc. Mobile communications devices, according to some embodiments of the present invention, may be chips carried by people and/or embedded within people and/or objects transported by people.

In some embodiments, each mobile communications device can directly communicate with all of the other mobile communications devices 12 of the system. In other embodiments, some mobile communications devices 12 may only have indirect communications ability. By way of example, a mobile communications device 12 mounted in an automobile might include a communications unit that is implemented as a Bluetooth transceiver. This Bluetooth transceiver could then interface with other mobile communications devices 12 and/or a system hub via a Bluetooth connection to a cellular telephone of one of the occupants of the automobile, and a cellular connection from that cellular telephone to a system hub.

It will also be appreciated that a mobile communications device 12 may encrypt data prior to broadcasting in order to protect the integrity of the system 10. Each mobile communications device 12 may also have authentication functionality so that other mobile communications devices 12 can confirm that they are receiving broadcast messages from valid parties of the system 10.

Each mobile communications device 12 is configured to broadcast product/service needs and/or product/service offerings of a party associated with the respective mobile communications device. Each mobile communications device 12 is configured to receive product/service needs and product/service offerings broadcast by other mobile communications devices when within a predetermined distance thereof, and each mobile communications device 12 is configured to identify when a product/service need or product/service offering broadcast by another mobile communications device matches a corresponding product/service offering or broadcast product/service need broadcast by the respective mobile communications device 12.

The illustrated system 10 also includes a transaction service 14 that is accessible by each mobile communications device 12 and that is configured to allow two parties that have a matching broadcast product/service need and offering to identify and communicate with each other. The transaction service 14 may be an internet-based service and may be implemented by a telecommunications service provider, for example. The transaction service 14 is configured to communicate with the mobile communications devices 12 in any of various ways including, but not limited to, cellular telephone communications, internet protocol or other packet switched wireless communications, etc. There may be numerous transaction services, according to embodiments of the present invention.

According to some embodiments of the present invention, when a first mobile communications device 12a passes within a predetermined distance of a second mobile communications device 12b and identifies that there is a match among a product/service need or offering broadcast by a second mobile communications device 12b and a product/service need or offering of a party associated with the first mobile communications device 12a, the first mobile communications device 12a contacts the transaction service 14 to obtain information regarding how to contact the party of the second mobile communications device 12b. The second mobile communications device 12b may also contact the transaction service 14.

According to some embodiments of the present invention, a transaction service 14 may not be required. For example, broadcast product/service needs and offerings may identify how to contact the broadcasting party. For example, when a first mobile communications device 12a identifies that there is a match among a product/service need or offering broadcast by a second mobile communications device 12b and a product/service need or offering of a party associated with the first mobile communications device 12a, the first mobile communications device 12a may utilize information contained within the message broadcast by the second mobile communications device 12b to directly contact the party of the second mobile communications device 12b.

According to some embodiments of the present invention, one or more of the mobile communications devices 12 may be configured to serve as an intermediary or "mule" that carries a previously broadcasted need and/or offering of another party associated with another mobile communications device 12. For example, a first mobile communications device 12a may pass within a predetermined range of a second mobile communications device and receive a broadcast need and/or offering of a party associated with the second mobile communications device 12b. The first mobile communications device 12a retains this information and is configured to identify when a product/service need or product/service offering broadcast by the second mobile communications device matches a corresponding product/service offering or broadcast product/service need broadcast by another mobile communications device 12. For example, the first mobile communications device passes within a predetermined range of a third mobile communications device 12c and receives a broadcast need and/or offering of a party associated with the third mobile communications device 12c that matches the need and/or offering of the party associated with the second mobile communications device 12b. The first mobile communications device 12a is configured to notify either or both of the second and third mobile communications devices 12b, 12c of the match. Alternatively, or in addition thereto, the first mobile communications device 12a may be configured to notify the transaction service 14 of the match. The transaction service 14 may then communicate with the second and third mobile communications devices 12b, 12c to facilitate a transaction.

As used herein, the term "mule" includes both a communication device that carries a previously broadcasted need and/or offering of another party associated with another mobile communications device 12 and the person that carries the communication device. Thus, reference to a mule is intended to include both a person and a communications device of the person that serves the function of a mule as described herein.

According to some embodiments of the present invention, the transaction service 14 may be configured to allocate a percentage of a transaction value to a party associated with a mobile communications device 12 that serves as an intermediary that carries a broadcasted need and/or offering that results in a consummated transaction among other parties. For example, in the scenario described above, the first mobile communications device 12a served as an intermediary and identified a match among the product/service need or product/service offering broadcast by the second and third mobile communications devices 12b, 12c. The transaction service 14 may award the party associated with the first mobile communications device 12a a "finder's fee" which may be a percentage of the transaction value or some other amount. Alternatively, the transaction service 14 may award the party associated with the first mobile communications device 12a a non-monetary award. According to other embodiments of the present invention, one or both of the parties associated with the second and third mobile communications devices may award the party associated with the first mobile communications device 12a a "finder's fee" or some other non-monetary award. For example, if no transaction service is utilized, payment of some kind to a mule likely will be necessary to provide an incentive for matching buyers and sellers. Payment need not be in the form of a percentage of a transaction value (i.e., a monetary payment), but may be in the form of a non-monetary payment (e.g., discounts on goods and services, etc.).

According to some embodiments of the present invention, the transaction service 14 may be configured to vary the amount of a "finder's fee" over time. For example, if a mobile communications device 12 identifies a match of product/service needs and offerings broadcast by two other mobile communications devices 12, but the match is identified, for example, thirty days after the first broadcast was received, the finder's fee may be less than if the match was identified within ten days of when the first broadcast was received. In other words, the transaction service 14 may decrease, or otherwise vary, an award over time. Thus, award values to mules may decay over time.

According to some embodiments of the present invention, the system 10 may include one or more stationary communications devices (i.e., communications devices mounted on stationary objects) 16 that serve the function of "passive mules" and that are configured to broadcast product/service needs of respective parties associated with the stationary communications devices. Exemplary stationary objects that may include communications devices configured to broadcast product/service needs and/or offerings may include, but are not limited to, signs, light posts, telephone poles, buildings, homes, etc. Moreover, stationary communications devices 16 configured to broadcast product/service needs and/or offerings can be positioned adjacent to and/or within stores, offices, restaurants, museums, parks, etc. Mobile communications devices 12 are configured to receive the product/service needs and/or offers broadcast by stationary communications devices 16 when passing within a predetermined distance thereof, and are configured to identify when broadcast product/service needs and/or offers match product/service offerings and/or needs of parties associated with the mobile communications devices 12. Stationary communications devices 16 can be configured to broadcast out to various distances. For example, a stationary communications device may be configured to broadcast product/service needs and product/service offerings up to a radius of about one hundred fifty (150) feet from the stationary communications device 16.

According to embodiments of the present invention, mules may pass by a stationary communications device 16 and convey product/service needs of respective parties associated with the stationary communications device 16 to others located wherever the mules travel.

According to a particular embodiment of the present invention, a real estate sign positioned adjacent to a property for sale may be equipped with a communications device configured to broadcast information about the property. A mobile communications device 12 may be configured to receive the information broadcast by a communications device attached to the sign. A mobile communications device 12 may also be configured to communicate with the communications device attached to the sign and obtain additional information. A transaction service 14 may serve the function of a real estate brokerage. For example, if a party associated with a mobile communications device 12 is interested in the property for sale based upon broadcast information received by the party's mobile communications device, the party contacts the transaction service 14 to pursue making a purchase offer on the property, etc.

The communications device associated with the real estate sign may be configured to gather data from people passing by the real estate sign. For example, the communications device associated with the real estate sign may gather information about what type of house people are looking for, what price range of house people are looking for, what size of house people are looking for, what type of neighborhood schools people are looking for, etc. As such buyer demographic data can be accrued by the communications device associated with the real estate sign which can be beneficial to the real estate broker, as well as to others. Moreover, collected data can be leveraged (i.e., sold, leased to third parties, etc.).

Figure 2:
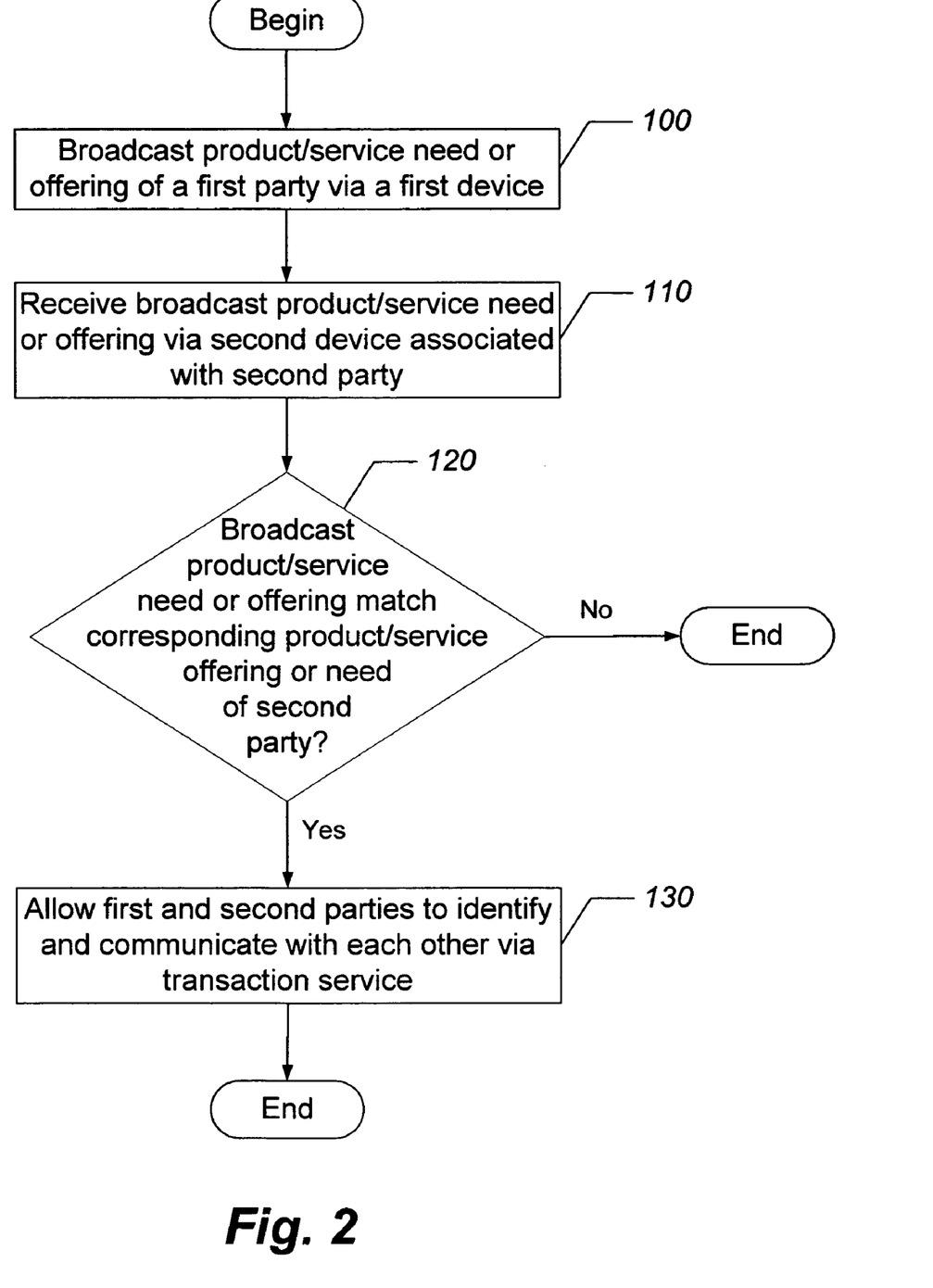
FIGS. 2-3 are flow charts that illustrate exemplary operations for facilitating transactions among parties, according to some embodiments of the present invention.

Exemplary operations for facilitating transactions among parties, according to some embodiments of the present invention, will now be described with reference to FIGS. 2-3. Referring initially to FIG. 2, a product/service need or offering of a first party is broadcast via a mobile communications device associated with the first party (Block 100). The broadcast product/service need or offering is received by a second communications device associated with a second party when the first and second devices are within a predetermined distance of each other (Block 110). A determination is made whether the broadcast product/service need or offering of the first party matches a corresponding product/service offering or need of the second party (Block 120). If the answer is yes (Block 130) the first and second parties identify and communicate with each other via a transaction service that is accessible by the mobile communications devices (Block 140). If the answer is no (Block 130), operations end; however, the second mobile communications device continues to monitor and receive broadcasts from other devices that it passes within a predetermined distance thereof.

Figure 3:
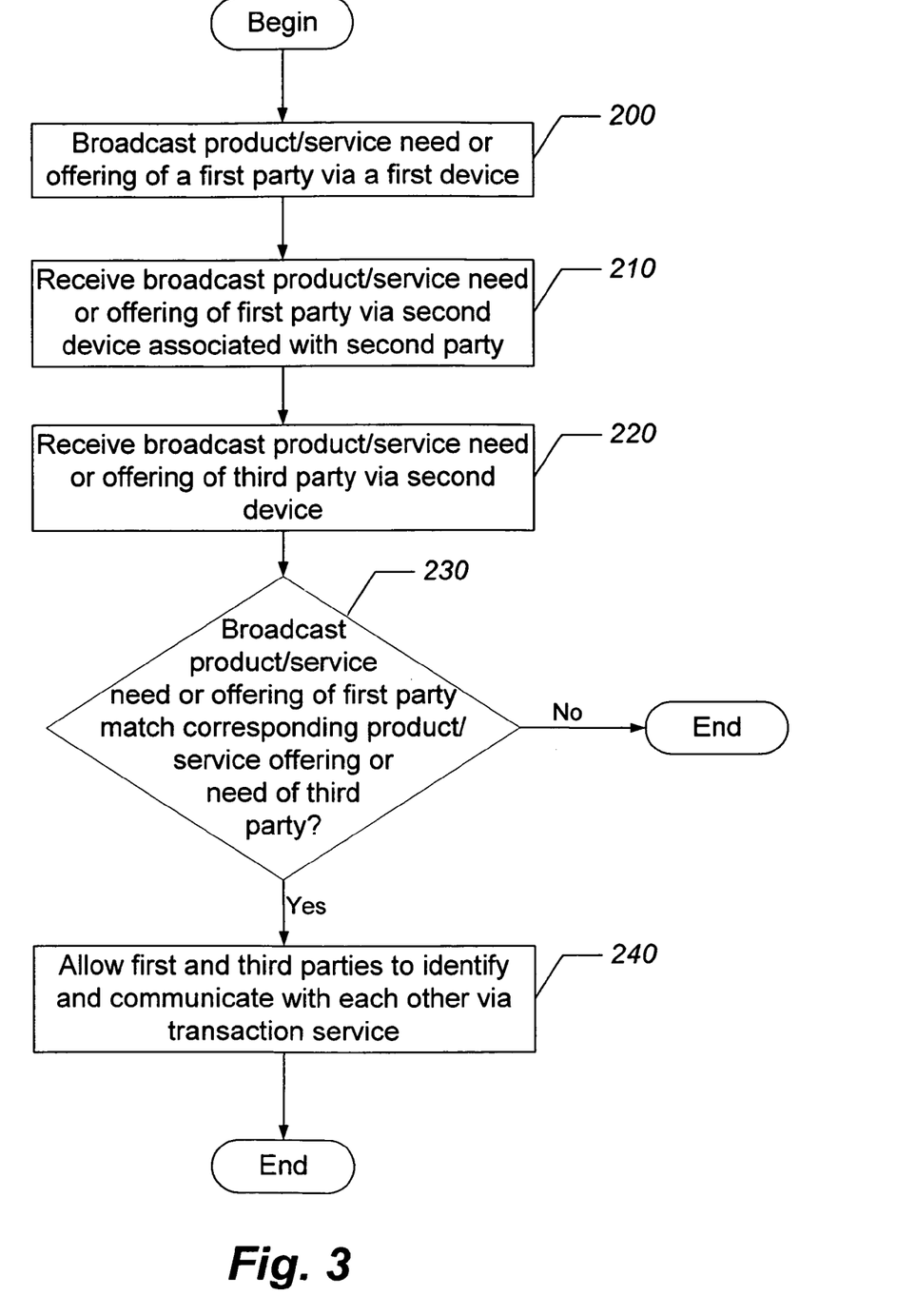

According to other embodiments illustrated in FIG. 3, a product/service need or offering of a first party is broadcast via a mobile communications device associated with the first party (Block 200). The broadcast product/service need or offering is received by a second communications device associated with a second party when the first and second devices are within a predetermined distance of each other (Block 210). The second-communications device receives a broadcast product/service need or offering from a third communications device associated with a third party when the second and third devices are within a predetermined distance of each other (Block 220). A determination is made whether the broadcast product/service need or offering of the first party matches a corresponding product/service offering or need of the third party (Block 230). If the answer is yes (Block 240) the first and third parties identify and communicate with each other via a transaction service that is accessible by the mobile communications devices (Block 250). If the answer is no (Block 240), operations end; however, the second mobile communications device continues to monitor and receive broadcasts from other devices that it passes within a predetermined distance thereof.

Embodiments of the present invention facilitate the implementation of transparent commodity trading networks and viral marketing. Via communications device broadcasts, some individuals effectively have "clouds" of products/services for sale surrounding them and some individuals effectively have clouds of wants and/or needs surrounding them. When clouds of products/services and wants/needs attract each other, a transaction can take place. As known to those skilled in the art of the present invention, viral marketing includes marketing techniques that induce consumers to pass on a marketing message to other consumers, creating a potentially exponential growth in the message's visibility and effect.

Figure 4:
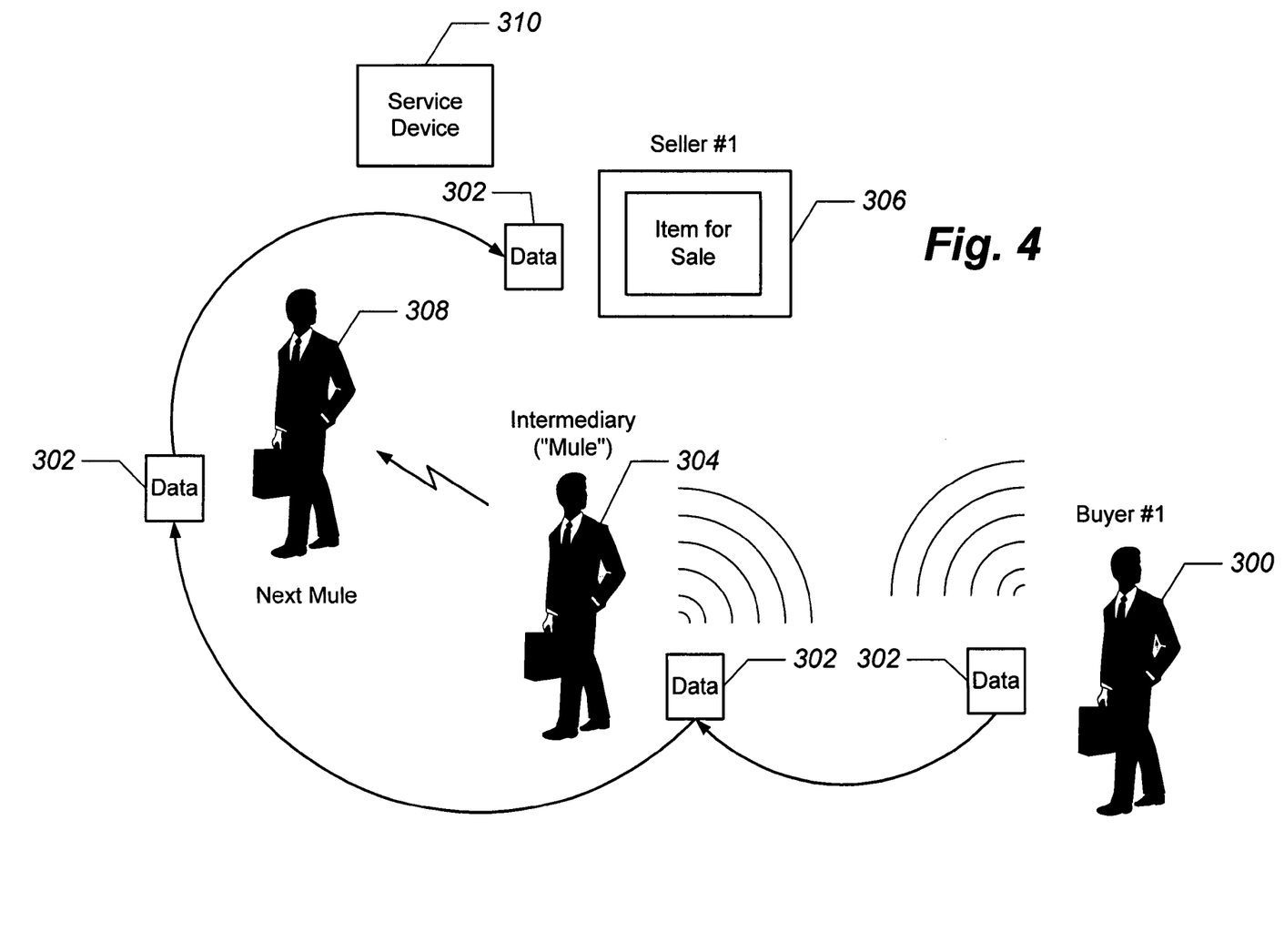
FIG. 4 illustrates a transparent commodity trading network, according to some embodiments of the present invention.

Referring to FIG. 4, a transparent commodity trading network according to some embodiments of the present invention is illustrated. In FIG. 4, buyer #1 (300) is broadcasting what product and/or service he/she wants to buy (e.g., the buyer may be interested in buying a toolbox) via a mobile communications device (not shown) as described above. Buyer #1 (300) broadcasts a data structure 302 that includes information about who the buyer is, what the buyer wants, when the buyer wants it (e.g., there may be a deadline by which the buyer needs to purchase an item/service, etc.), how the buyer wants to acquire it, how much the buyer wants to pay for it, how to contact the buyer, availability (dates), form of payment, etc. Data structure 302 most probably would be anonymized, for example via use of a MAC (media access control) address. However, it is not required that data structures be anonymized according to embodiments of the present invention. As known to those skilled in the art of the present invention, a MAC address is a device's unique hardware number.

Another person serving the function of an intermediary or mule 304 comes within proximity of buyer #1 (300), as illustrated. The mule 304 may also be broadcasting, via a communications device (not shown), a data structure related to wants/needs that the mule 304 has or that others have, or products/services that the mule 304 wants to sell or that others have to sell. The mule 304 receives the data structure 302 from buyer #1 (300) and relays this data structure to seller #1 (306) who has a toolbox for sale. Note that additional mules may participate in the relay of data structure 302 to seller #1 (306). For example, in the illustrated embodiment, a second mule 308 receives the data structure 302 from mule 304 and relays the data structure 302 to seller #1 (306). Mules, according to embodiments of the present invention, may not even be aware that they are carrying data structures of buyers and sellers. For example, mules 304 and 308 may not be aware that they facilitated the relay of data structure 302 from buyer #1 (300) to seller #1 (306).

Seller #1 (306), using information contained in the received data structure 302, contacts service device 310 to complete a transaction with buyer #1 (i.e., to sell a toolbox to buyer #1). Service device 310 serves the function of the transaction service described above with respect to FIG. 1 (i.e., transaction service 14). Service device 310 acts as a broker and handles the mechanics of transactions between buyers and sellers.

Mules, according to embodiments of the present invention, may be bi-directional. In other words, a mule may carry the data structures of both sellers and buyers. For example, mules 304 and 308 may carry data structures from both buyer #1 (300) and seller #1 (306), as well as from other buyers and sellers. However, there may be embodiments of the present invention wherein a mule is configured to only carry data structures of buyers or sellers.

Mules may be particularly effective in small communities of buyers and sellers and/or when in close proximity of buyers and sellers such as, for example, on subways, in airports, at events with lots of people (e.g., sporting events), etc. As another example, a mule may visit a grocery store and obtain data structures for items on sale at the grocery store. When the mule returns to his/her neighborhood, the mule broadcasts these data structures to neighbors and receives broadcasts of needs from the neighbors. For example, a grocery store may be having a sale on bananas and the mule may learn that a neighbor has a need for bananas. As such, the mule conveys the information of the banana sale to the neighbor such that he/she can visit the grocery store and purchase bananas.

According to embodiments of the present invention, mules 304 and 308 may receive commissions for participating in the relay of data structure 302 from buyer #1 (300) to seller #1 (306). Mules, according to some embodiments of the present invention, may also accrue currency/commissions over a period of time. For example, a mule may be carrying around multiple data structures of buyers and sellers and when a transaction between a buyer and a seller occurs, the mule earns a commission. This may occur without the mule ever knowing that he/she is carrying the data structures and without ever knowing that a transaction between a buyer and a seller has occurred. Earned commissions may be allowed to accrue for a predetermined period of time prior to actually paying a mule.

According to some embodiments of the present invention, mules may be paid in non-monetary ways. For example, a mule may receive discounts from certain sellers for facilitating transactions with buyers. Discounts may be available for predetermined periods of time. A mule may receive frequent flyer miles from an airline to be used within a period time, discounts from retailers to be used within a period of time, etc. A mule may receive discounts that are limited to a particular geographical area, for example.

According to some embodiments of the present invention, mules may be configured to complete a transaction between buyers and sellers. For example, a mule may be carrying a data structure of a buyer that indicates that the buyer wants to buy a pair of running shoes. If the mule detects a seller selling the particular running shoes at conditions that satisfy the buyer, the mule may be configured to purchase the running shoes and deliver them to the buyer. For example, in the embodiment of FIG. 4, mule 304 may be configured to purchase a toolbox from seller #1 (306) and deliver the toolbox to buyer #1 (300), who then repays the mule 304 and likely pays the mule 304 a commission for his/her effort.

Figure 5:
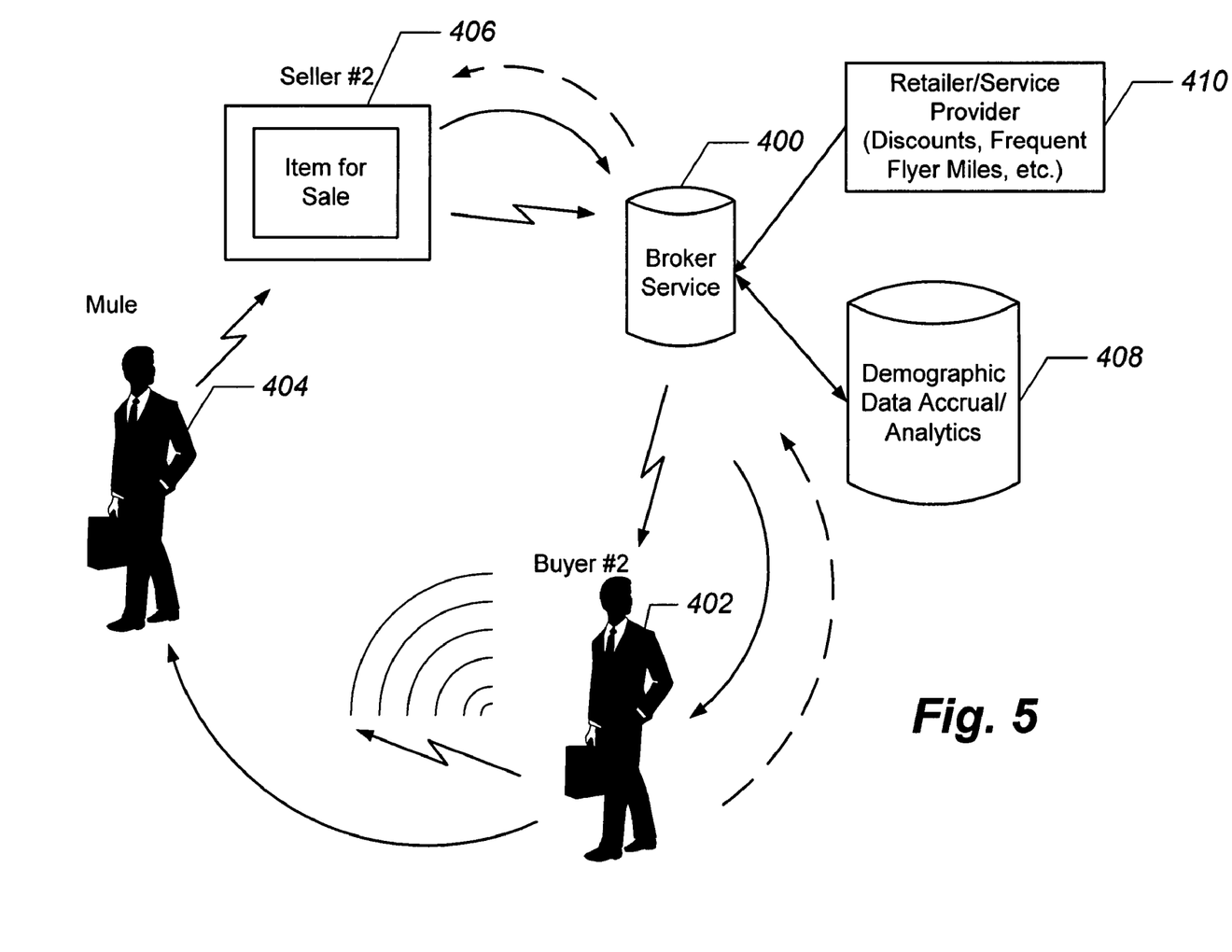
FIG. 5 illustrates a transparent commodity trading network, according to some embodiments of the present invention.

Referring now to FIG. 5, transparent commodity trading network according to some embodiments of the present invention is illustrated. A broker service 400 is illustrated that, in addition to facilitating transactions between buyers and sellers as described above, implements various additional features. In FIG. 5, buyer #2 (402) and seller #2 (406) complete a transaction via a mule 404 and broker service 400 (which serves the function of transaction service 14, as described above). The broker service 400 is also configured to accrue information about buyers and sellers. For example, the broker service-maintains a database 408 of demographic and other types of data associated with buyers and sellers. The broker service 400 may also perform various analytical analyses on collected data in the database 408. Analytic information as well as data can be provided to buyers, sellers, and/or other third parties for free or for a price. For example, third parties may subscribe to an information service that the broker service 400 offers, etc.

In a residential real estate environment, broker service 400 may collect demographic data associated with buyers and sellers of residential real estate. Exemplary information collected by the broker service 400 may include information about what type of house people are looking for, what price range of house people are looking for, what size of house people are looking for, what type of neighborhood schools people are looking for, etc. As such buyer demographic data can be accrued by the broker service 400, which can be beneficial to real estate brokers, other service providers, etc.

Broker service 400 may also provide ratings of products/services bought and sold via buyers and sellers. For example, broker service 400 may be configured to collect information from buyers as to quality and price of products and services from various sellers and make this information available to others (e.g., either free or for a price). Broker service 400 may also be configured to monitor and maintain information about the accuracy of information passed between buyers and sellers. Broker service, may thus serve the function of preventing or at least reducing fraud in transactions. Third parties may also subscribe to the broker service 400 to obtain ratings information regarding various sellers and/or buyers and the products/services of sellers. As such, broker service 400 can leverage information collected thereby, etc.

Broker service 400 may also facilitate the distribution of discounts and other types of benefits between sellers and buyers. (Broker service 400 itself may receive incentives from third parties for facilitating transactions between buyers and sellers). For example, broker service 400 may facilitate transactions between an airline and buyers of airline tickets. Broker service 400 may facilitate distribution/allocation of frequent flyer miles to various buyers. As another example, broker service 400 may facilitate transactions between retailers and buyers. Broker service 400 may facilitate distribution/allocation of discounts to various buyers.

Broker service 400 may also facilitate the accrual and distribution of payments to mules who relay data structures between buyers and sellers, as described above. Broker service 400 may be configured to modify the accrual of payments according to time. As described above, the value of facilitating a transaction between buyers and sellers may decay over time. Broker service 400 may be configured to adjust payments to mules based on such time requirements.

FIGS. 1-5 illustrate the architecture, functionality, and operations of some embodiments of transparent commodity trading networks and methods for facilitating transactions among parties. In this regard, each block represents a module, segment, or portion of code, which comprises one or more executable instructions for implementing the specified logical function(s). It should also be noted that in other implementations, the function(s) noted in the blocks may occur out of the order noted in FIGS. 2-3. For example, two blocks shown in succession may, in fact, be executed substantially concurrently or the blocks may sometimes be executed in the reverse order, depending on the functionality involved.

Many variations and modifications can be made to the preferred embodiments without substantially departing from the principles of the present invention. All such variations and modifications are intended to be included herein within the scope of the present invention, as set forth in the following claims.

That which is claimed:

1. A method of buying and selling goods and services via a transparent commodity trading network, comprising:
    broadcasting at least one of a need and offering of a first party to other mobile communication devices via a first mobile communications device associated with the first party, comprising broadcasting the at least one need and offering to a third mobile communications device associated with a third party, wherein the third mobile communications device is configured to serve as a mule that carries and broadcasts the at least one need and offering of the first party to multiple other mobile communications devices;
    identifying via the first mobile device at least one need and offering of a second party that matches the broadcast at least one need and offering via a second device within a predetermined distance of the first mobile device; and
    communicating, via the first mobile communications device, with the second mobile communications device in response to the first mobile communications device determining that the broadcast at least one need and offering matches a corresponding need and offering of the second party.

2. The method of claim 1, further comprising paying the third party for facilitating a transaction between the first party and another party.

3. The method of claim 1, further comprising accruing payments to the third party for facilitating transactions between the first party and other parties.

4. A transparent commodity trading network that facilitates transactions among parties, comprising:
    a transaction service that is accessible by a plurality of mobile communications devices, wherein the transaction service is configured to allow two parties that have at least one matching broadcast need and offering to identify and communicate with each other,
    wherein each mobile communications device is configured to broadcast needs and offerings of a party associated with the mobile communications device, to receive needs and offerings broadcast by other mobile communications devices when within a predetermined distance thereof, to identify when at least one need and offering broadcast by another mobile communications device matches at least one need and offering broadcast by the respective mobile communications device, and
    wherein each mobile communications device is configured to serve as a mule that carries at least one broadcasted need and offering of another party associated with another mobile communications device.

5. The transparent commodity trading network of claim 4, wherein the transaction service is configured to collect and analyze information associated with transactions between parties.

6. The transparent commodity trading network of claim 4, wherein the transaction service is configured to provide ratings of products and services associated with transactions between parties.

7. The transparent commodity trading network of claim 4, wherein the transaction service comprises a broker service.

8. The transparent commodity trading network of claim 4, wherein a mule is configured to identify when at least one need and offering broadcast by a second mobile communications device matches at least one need and offering broadcast by a third mobile communications device.

9. The transparent commodity trading network of claim 4, wherein the transaction service is configured to allocate a percentage of a transaction value to a party associated with a mobile communications device that serves as a mule that carries at least one broadcasted need and offering that results in a consummated transaction among other parties.

10. The transparent commodity trading network of claim 4, wherein the transaction service is configured to accrue currency for a party associated with a mobile communications device that serves as a mule that carries a broadcasted at least one need and offering that results in a consummated transaction among other parties.

11. The transparent commodity trading network of claim 10, wherein currency value decays over time.

12. The transparent commodity trading network of claim 9, wherein the transaction service is configured to vary the percentage of a transaction value over time.

13. The transparent commodity trading network of claim 4, wherein the mobile communications devices are selected from the group consisting of cell phones, PDAs, RFID devices, and Bluetooth devices.

14. The transparent commodity trading network of claim 4, further comprising a stationary communications device that is configured to broadcast a need of a party associated with the stationary communications device, and wherein a mobile communications device is configured to receive the need broadcasted by the stationary communications device and to identify when the broadcast need matches a broadcast offering of the party associated with the mobile communications device.

15. The transparent commodity trading network of claim 4, further comprising a stationary communications device that is configured to broadcast a need of a party associated with the stationary communications device, and wherein a mobile communications device is configured to receive the need broadcasted by the stationary communications device and to identify when the broadcast need matches a broadcast offering of a party associated with another mobile communications device.

16. The transparent commodity trading network of claim 4, further comprising a stationary communications device that is configured to broadcast an offering of a party associated with the stationary communications device, and wherein a mobile communications device is configured to receive the offering broadcasted by the stationary communications device and to identify when the broadcast offering matches a broadcast need of the party associated with the mobile communications device.

17. The transparent commodity trading network of claim 4, further comprising a stationary communications device that is configured to broadcast an offering of a party associated with the stationary communications device, and wherein a mobile communications device is configured to receive the offering broadcasted by the stationary communications device and to identify when the broadcast offering matches a broadcast need of a party associated with another mobile communications device.

\* \* \* \* \*